Jan. 31, 1928.
E. T. WILLIAMS
BRAKE TESTING DEVICE
Filed April 5, 1927
1,657,812
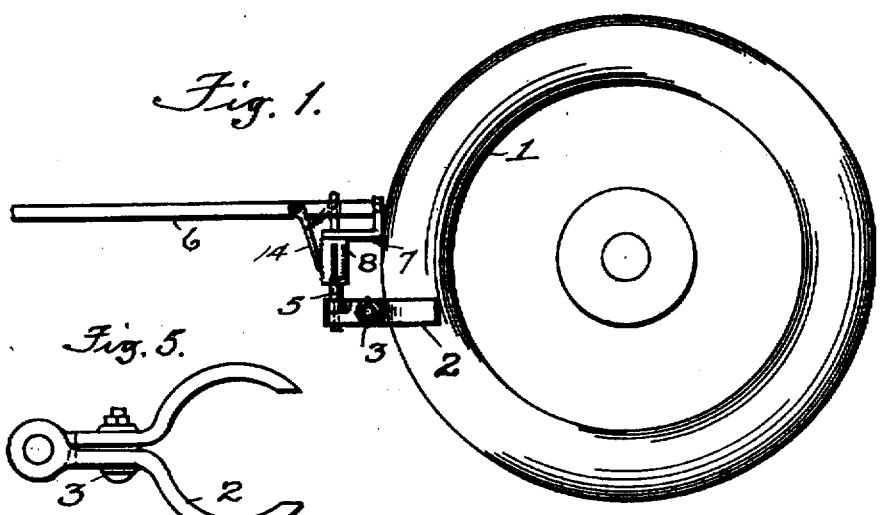
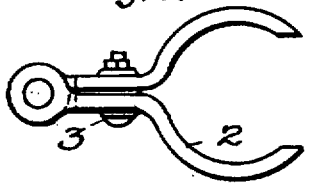
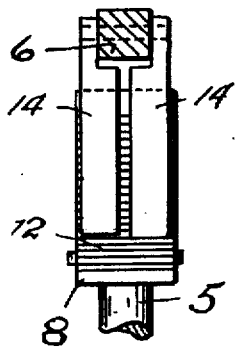
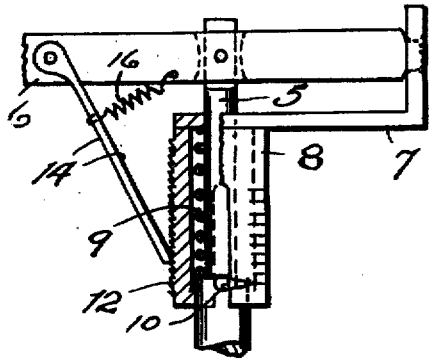
Inventor
Edward T. Williams,
By
Attorney Patented Jan. 31, 1928.

1,657,812

UNITED STATES PATENT OFFICE.

EDWARD T. WILLIAMS, OF SHOEMAKERSVILLE, PENNSYLVANIA.

BRAKE-TESTING DEVICE.

Application filed April 5, 1927. Serial No. 181,024.

This invention relates to improvements in brake testing devices, and the object in the present instance is to provide a device of comparatively simple construction, adapted for use in testing automobile brakes and capable of being applied in turn, to each wheel of the vehicle, to determine the exact pressure necessary to find the braking point.

The invention consists of a tire gripping element, a lever for moving the wheel against the brake action, and a gauge to determine the amount of "pull" required on said lever to determine the resistance of each wheel.

The invention is more fully described in the following specification and clearly illustrated in the accompanying drawing, in which:—

Figure 1 is a side elevation of my device, applied to a vehicle wheel, ready for actuation.

Figure 2 is a plan view thereof.

Figure 3 is a side elevational view, partly in section, and enlarged, of the gauge and the actuating mechanism.

Figure 4 is a front view thereof.

Figure 5 is a detail of the tire gripping jaw.

The numeral 1 designates a vehicle wheel to which my device is applicable. The testing device comprises a tire gripping jaw member 2, made up of two jaw elements and means in the form of a set screw 3 for tightening them on the tire.

This jaw is provided with a vertical rod 5, whose upper end is attached to an operating handle 6. On the outer end of this handle is attached a bracket 7 which is formed with a depending hollow block 8 through which the rod 5 passes and a coiled spring 9 is located within this block and surrounding the rod, to keep the rod normally extended, or in lowermost position. The rod carries a pointer 10 and the outer surface of the block is graduated, so that the movement of the rod in the block is indicated thereon.

The outer surface of this member 8 is also formed with a series of serrations 12, and suspended from the operating handle 6 is a pair of pawls 14, one on either side thereof, and both of which are adapted to engage the said serrations. One of the pawls is slightly longer than the other, the difference in length being about one half the distance between any two of said serrations, to the end that when the handle is actuated, as will be described later, one of these pawls will always be in engagement with the serrated surface.

The numeral 16 designates springs for keeping the pawls normally in contact with the serrated surface of the member 8.

The operation of the device is simple:

The jaw is placed in engagement with the tire of a wheel, the heel of the bracket 7 rests against the surface of the tire, and the handle 6 is raised, pulling the wheel against the set brake. The degree of "pull" required is indicated on the graduate, and the point registered is retained thereon, due to the pair of pawls in engagement with the serrated surface of the member 8, which has been held stationary while the rod 5 carrying the pointer has been moved therein against the action of the spring 9.

It will be noted therefore, that this simple and easy actuation of each vehicle wheel against the set brake, may be accomplished rapidly and that the result is particularly satisfactory because accurate brake adjustment is possible by any person, and the attention of an expert is not required.

Having thus fully described my invention, what I claim and desire to secure by Letters Patent is:—

1. In a vehicle brake testing device, a jaw for engaging the wheel tire, a rod carried by the jaw, an actuating lever attached to one end of the rod, a bracket carried on the other end of the rod, said bracket having a hollow depending portion through which said rod passes, a coiled spring within said hollow portion and bearing against the bracket and the rod, and surrounding the rod, a spring resistance indicator carried by the rod, there being a series of serrations on said hollow portion, and a pair of pawls of different lengths, carried by the actuating lever and in engagement with said serrations.

2. In a brake testing device, a jaw for engaging a wheel, a rod carried by the jaw, an actuating handle for the rod, a bracket carried by the handle and adapted to rest against the wheel surface, a spring surrounding the said rod, against which spring the said bracket moves said rod having means against which the spring bears, to compress it against the rod, an indicator to determine the degree of compression of the spring, and a pair of pawls carried by the rod and engaging the bracket to hold the indicator in registered position.

3. In a brake testing device, the combination of a wheel engaging jaw, a rod thereon, a handle for the rod, a bracket adapted to bear against the wheel and carried by the handle, said rod having means against which the spring bears, a spring arranged for compression between the rod and the bracket and a pair of pawls carried by the rod and engaging the bracket.

In testimony whereof I affix my signature.

EDWARD T. WILLIAMS.

it against the rod, an indicator to determine the degree of compression of the spring, and a pair of pawls carried by the rod and engaging the bracket to hold the indicator in registered position.

3. In a brake testing device, the combination of a wheel engaging jaw, a rod thereon, a handle for the rod, a bracket adapted to bear against the wheel and carried by the handle, said rod having means against which the spring bears, a spring arranged for compression between the rod and the bracket and a pair of pawls carried by the rod and engaging the bracket.

In testimony whereof I affix my signature.

EDWARD T. WILLIAMS.

CERTIFICATE OF CORRECTION.

Patent No. 1,657,812.  Granted January 31, 1928, to

EDWARD T. WILLIAMS.

It is hereby certified that error appears in the printed specification of the above numbered patent requiring correction as follows: Page 2, lines 11 and 12, claim 3, strike out the words "a spring arranged for compression between the rod and the bracket" and insert the same to follow after the word "handle" in line 10; and that the said Letters Patent should be read with this correction therein that the same may conform to the record of the case in the Patent Office.

Signed and sealed this 20th day of March, A. D. 1928.

M. J. Moore,
Acting Commissioner of Patents.

Seal.

CERTIFICATE OF CORRECTION.

Patent No. 1,657,812.            Granted January 31, 1928, to

EDWARD T. WILLIAMS.

It is hereby certified that error appears in the printed specification of the above numbered patent requiring correction as follows: Page 2, lines 11 and 12, claim 3, strike out the words "a spring arranged for compression between the rod and the bracket" and insert the same to follow after the word "handle" in line 10; and that the said Letters Patent should be read with this correction therein that the same may conform to the record of the case in the Patent Office.

Signed and sealed this 20th day of March, A. D. 1928.

Seal.
                             M. J. Moore,
                     Acting Commissioner of Patents.